(No Model.) 2 Sheets—Sheet 1.
F. E. ODELL.
ORCHARD DITCHING MACHINE.
No. 547,154. Patented Oct. 1, 1895.
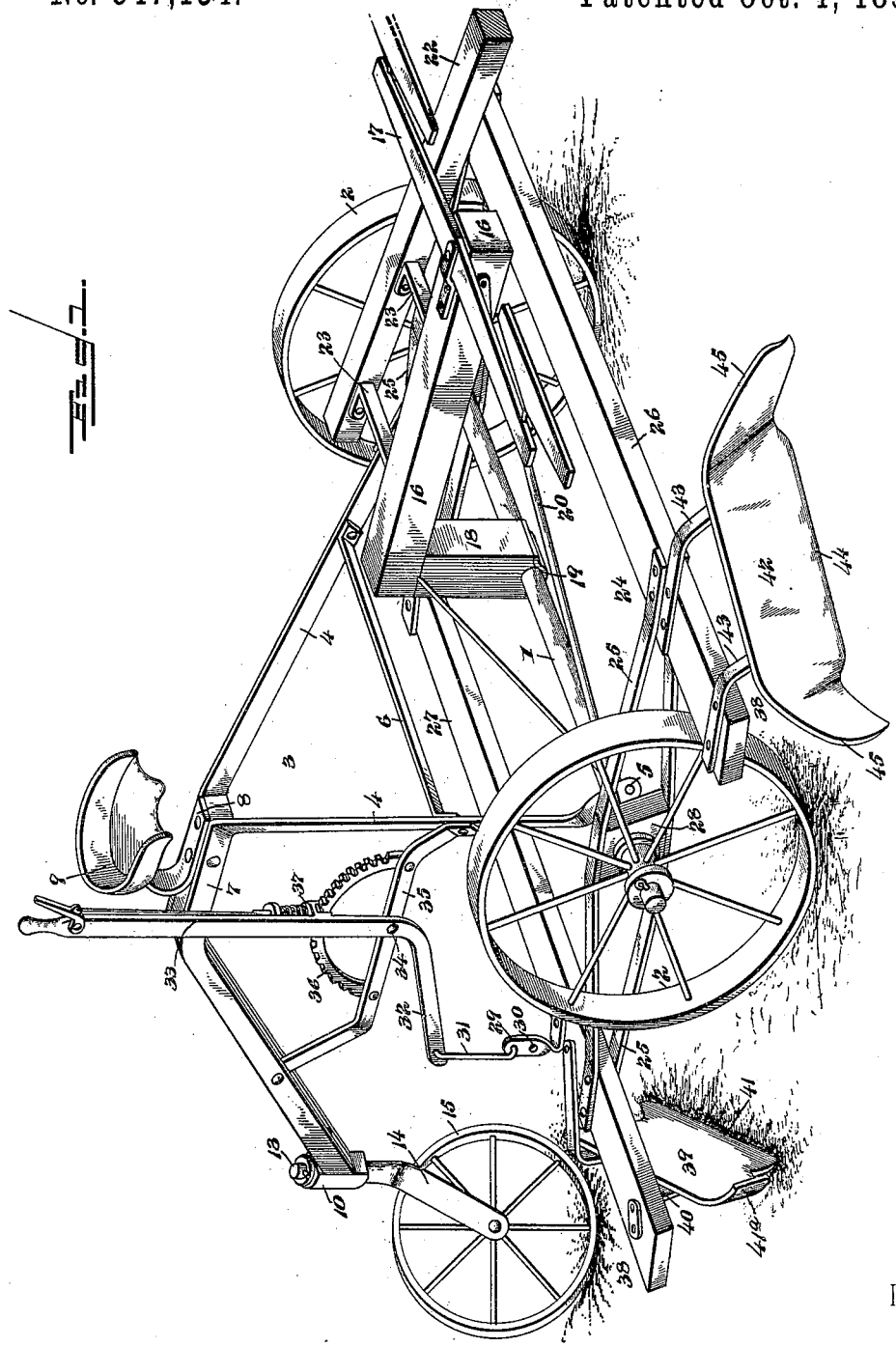
Witnesses
E. N. Stewart
D. P. Wolhaupter
Inventor
Frank E. Odell
By his Attorneys.
C. A. Snow & Co.

(No Model.) 2 Sheets—Sheet 2.
F. E. ODELL.
ORCHARD DITCHING MACHINE.
No. 547,154. Patented Oct. 1, 1895.
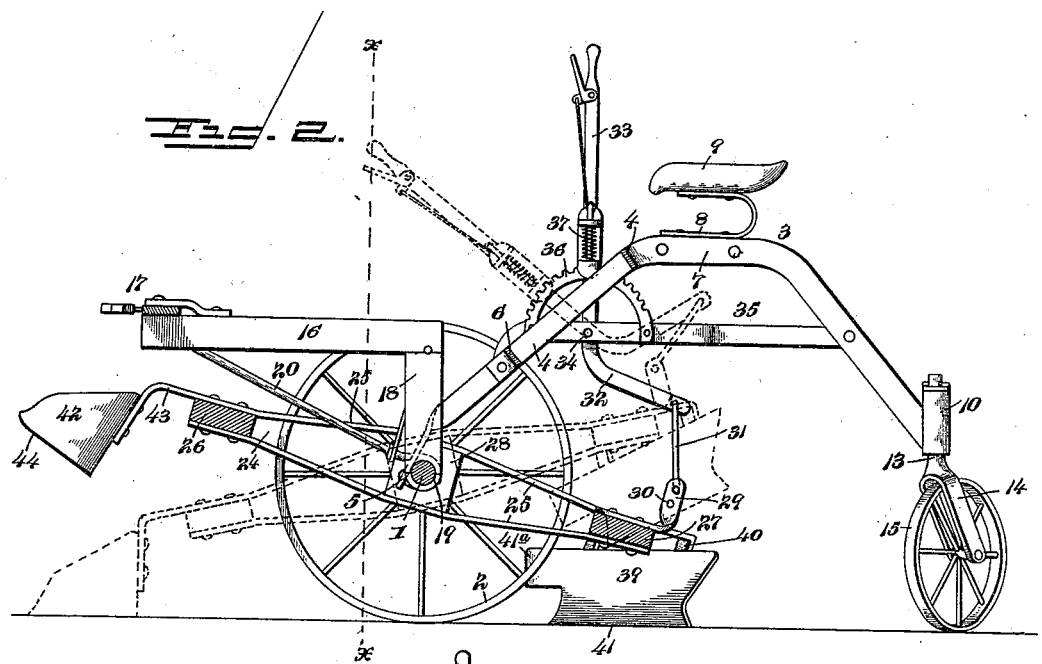
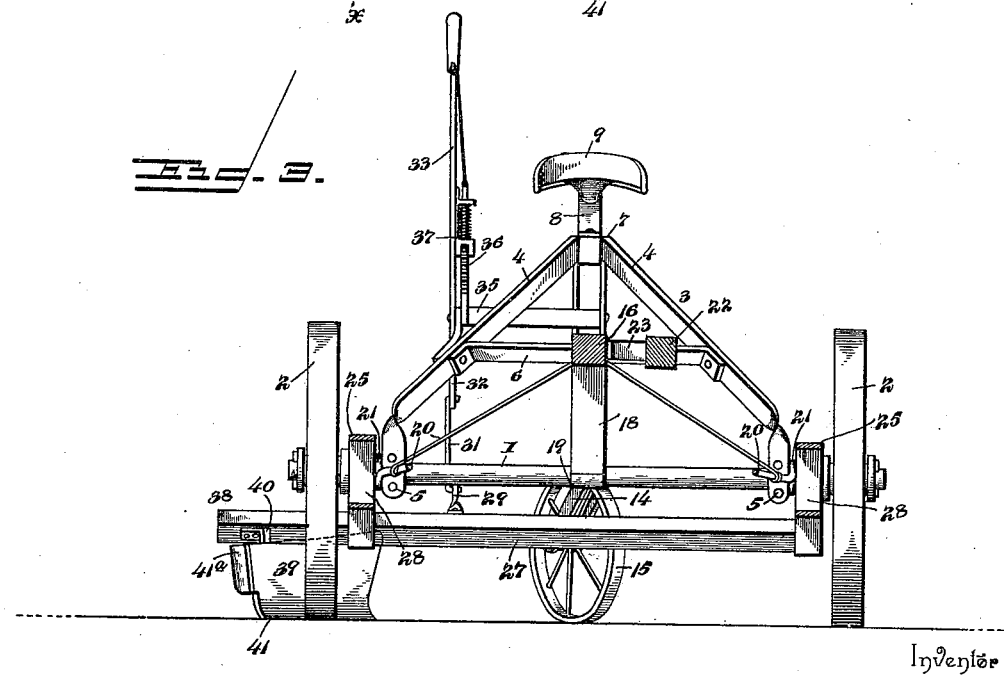
Witnesses
E. N. Stewart
D. P. Holhaupter
Inventor
Frank E. Odell
By his Attorneys,
C. A. Snow & Co.

UNITED STATES PATENT OFFICE.

FRANK E. ODELL, OF GLENDORA, CALIFORNIA.

ORCHARD DITCHING-MACHINE.

SPECIFICATION forming part of Letters Patent No. 547,154, dated October 1, 1895.

Application filed December 4, 1894. Serial No. 530,807. (No model.)

*To all whom it may concern:*

Be it known that I, FRANK E. ODELL, a citizen of the United States, residing at Glendora, in the county of Los Angeles and State of California, have invented a new and useful Orchard Ditching-Machine, of which the following is a specification.

This invention relates to orchard ditching-machines; and it has for its object to provide a new and useful machine of this character especially adapted for the use of orchardists for irrigating purposes.

To this end the main and primary object of the present invention is to provide a ditching-machine constructed so as to be adapted to make a ditch or circular basin around trees, to receive water for irrigating such trees, and also to provide means for filling up the ditch or basin after the ground around the trees has been irrigated and properly dried; and in this connection it is to be noted that the machine is especially available for use in the irrigation of citrus and similar trees which absolutely require irrigation.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of an orchard ditching-machine for irrigating purposes constructed in accordance with this invention, showing the shovel-frame adjusted to lower the ditching-shovel into operative position. Fig. 2 is a central longitudinal sectional view of the machine, showing in full lines the shovel-frame adjusted with the ditching-shovel lowered, and in dotted lines the frame adjusted with the filling-shovel lowered. Fig. 3 is a transverse sectional view on the line $x\,x$ of Fig. 2.

Referring to the accompanying drawings, 1 designates the horizontal axle of the machine, on the opposite spindle-extremities of which are mounted the opposite ground-wheels 2, that provide for supporting the machine for travel over the ground either during transportation or during the operation of the machine when the same is carried circularly around a tree to provide for digging a ditch or basin or for filling up the same.

The horizontal wheeled axle 1 has extended rearwardly therefrom a metallic arched runner-frame 3, that is provided at its front end with the divergent frame-bars 4, that are clipped at their lower front ends, as at 5, onto the axle 1 near its opposite ends, and said divergent frame-bars 4 are connected at an intermediate point by a transverse brace-bar 6, that securely strengthens the front ends of the runner-frame 3. The said arched runner-frame 3 supports on the intermediate elevated portion 7 thereof a curved seat-arm 8, on which is mounted an ordinary driver's seat 9 for the driver controlling the draft-animals, and the disposition of the brace-bar 6 in front of the driver's seat provides a convenient foot-rest for the driver. At its rear end the arched frame 3 carries a bearing-box 10, in which is journaled the vertical spindle 13 of the bearing-fork 14, in which is mounted the rear self-adjusting runner-wheel or caster 15, that forms a support for the rear end of the runner-frame and readily adjusts itself to the circular travel of the machine while in operation.

Arranged in front of the arched runner-frame 3 is the stub draft-tongue 16, to which is adapted to be coupled an ordinary doubletree 17, to which the animals are hitched for drawing the machine over the ground, and said stub-tongue 16 is provided at its inner extremity with a depending attaching-post 18, that is pivotally clamped onto the axle 1 at a central point, as at 19, and at its inner end the said stub-tongue 16 has connected to its opposite sides opposite brace-rod frames 20, that are also pivotally connected to the axle 1, as at 21, at one side of the clip connections 5 for the runner-frame, and said side brace-rod frames 20 serve to hold the tongue 16 properly positioned and to relieve the connection thereof with the axle from lateral strain. The said stub-tongue 16, by reason of its pivotal connection with the axle, will adjust itself independently of the other parts of the machine and will be carried by the draft-animals in a level position, and arranged at one side of the stub-tongue 16 is a forwardly-extending pole 22. The pole 22 extends forwardly from the tongue 16 between the draft-animals and is adapted to carry at its outer end the usual neck-yoke for the animals, and said pole 22 is held supported in its offset forwardly-extending position by means of the offstanding bracket-straps 23, that are fastened at one end to one side of the stub-tongue 16 and at their other ends to the inner side of the pole 22. The pole 22, by reason of its disposition at one side of the stub draft-tongue, gives the inside draft-animal more room to make the circle to the right around the tree, as will be readily understood. The wheeled axle 1 pivotally supports thereon a tilting adjustable shovel-frame 24. The tilting adjustable shovel-frame 24 comprises opposite pairs of reversely-bowed side frame-bars 25 and opposite parallel front and rear draw bars or beams 26 and 27, respectively, that are securely bolted between the front and rear ends of the pairs of said frame-bars 25. The side frame-bars 25 are passed above and below the axle and have fitted therebetween at a central point the bearing-boxes 28, that are loosely mounted on the axle 1 in order to allow the frame to be tilted for the purpose of raising or lowering either of the draw bars or beams 26 27, and the rear draw bar or beam 27 has attached thereto an angled plate 29, provided in one of its arms with a series of perforations 30, adapted to loosely receive one end of an adjusting-link 31, the other end of which is pivotally connected to the lower angled end 32 of an adjusting-lever 33. The adjusting-lever 33 is pivotally mounted intermediate of its ends, as at 34, at one side of an offstanding attaching-bracket 35, secured to one side of the arched runner-frame 3, and said bracket also has mounted thereon a stationary notched segment 36, at one side of which works the lever 33, and the notches of which are adapted to be engaged by the hand-operated catch-dog 37, mounted on and carried by the lever 33. The lever 33 is disposed adjacent to the driver's seat and is easily manipulated by the driver for raising and lowering either the front or rear ends of the shovel-frame 24.

The front and rear draw bars or beams 26 and 27 of the tilting shovel-frame are extended at one end, as at 38, beyond one of the ground-wheels 2 of the machine, and arranged under and carried by the extended end 38 of the rear draw bar or beam 27 is the rear ditching-shovel 39. The rear ditching-shovel 39 is suitably attached to the extended end 38 of the bar or beam 27 by means of suitable attaching-feet 40, fastened to the said bar or beam and to the rear side of the shovel 39, near the upper edge thereof. The rear ditching-shovel 39 is arranged directly in rear of one of the ground-wheels and may vary in different sizes, according to the width of the ditch or basin to be excavated, and the said ditching-shovel 39 extends inwardly and rearwardly at an angle to provide for properly excavating a ditch or basin of a width equal to the length of the shovel as the machine is carried in a circle around the tree that is to be irrigated. The said inwardly and rearwardly inclined shovel 39 is, more properly speaking, a shovel-blade and is slightly concaved and is provided with a lower forwardly-inclined cutting-edge 41, that easily enters the ground for the purpose of digging up the earth, and at its front outer end the said ditching-shovel is provided with a forwardly-curved flange-extension 41$^a$, narrower than the width of the shovel-blade and providing means for evenly lining up the ridge that is formed at the inner side of the ditch or basin excavated by the shovel.

By reason of the specific shape of the shovel 39 it is simply necessary to lower the rear end of the frame 24, carrying the said shovel, to provide for excavating a ditch or basin that will be ridged up at its outer and inner sides, and the inner ridge of the ditch or basin next to the tree being cultivated will prevent the water from running out of the ditch or basin and wetting the ground next to the tree, in which event the ground would bake very hard, and there is no means of working the ground under the foliage of such trees as citrus trees and the like, in connection with which the herein-described machine is preferably employed. After the ditches or basins dug by the shovel 39 have been filled with water and allowed to properly dry, the said ditches or basins are evenly and smoothly filled up by means of the front filling-shovel blade 42. The filling-shovel blade 42 is arranged in front of the front draw bar or beam 26 and is attached to the end extension 38 thereof by means of the forwardly-projected angled attaching-feet 43. The shovel-blade 42 maintains the same forwardly direction as the blade 39 in rear thereof, but is set at an angle projecting inwardly and forwardly and much less sharply than the angle of the blade 39. The shovel-blade 42 is also provided with a lower forwardly-inclined cutting-edge 44 and is provided at its opposite ends with the forwardly-inclined end wings 45, the inner of which is somewhat abruptly bent from the shovel-blade. By reason of the specific construction and arrangement of the filling-shovel blade it is simply necessary to tilt the frame 24 forward to lower the said shovel-blade onto the ground, and as thus adjusted the travel of the machine will cause the blade 42 to evenly and smoothly fill in the ditch or basin.

Changes in the form, proportion, and the minor details of construction may be resorted to without departing from the principle or sacrificing any of the advantages of this invention.

Having thus described the invention, what is claimed, and desired to be secured by Letters Patent, is—

1. In a ditching machine of the class described, a wheeled tilting frame carrying forwardly operating shovels at its opposite front and rear ends, said shovels being set at different angles, and means for adjusting said frame, substantially as set forth.

2. In a ditching machine of the class described, a wheeled tilting frame carrying forwardly operating shovels at one side and at opposite ends, and means for adjusting said frame to simultaneously adjust the shovels carried thereby, substantially as set forth.

3. In a ditching machine of the class described, a wheeled tilting frame, an inclined ditching shovel attached to one end and side of said frame, a filling shovel attached to one end of said frame directly in advance of the ditching shovel and set at a different angle from the latter, and means for adjustably tilting said frame to simultaneously adjust the positions of the shovels, substantially as set forth.

4. In a ditching machine of the class described, a wheeled axle, a tilting shovel frame pivotally mounted on said axle and provided with front and rear draw-bars or beams, an inclined ditching shovel attached to the rear draw-bar or beam at one end thereof, a filling shovel attached to the front draw-bar or beam at one end thereof directly in advance of the ditching shovel and set at a different angle from the latter, and means for adjusting said frame to raise and lower the front and rear draw bars or beams thereof, substantially as set forth.

5. In a machine of the class described, a wheeled axle, an adjustable tilting shovel frame comprising opposite pairs of reversely bowed side frame bars, and front and rear horizontal draw-bars connected to the ends of said side bars and provided with extensions at one end extended beyond the inner wheel of the axle, bearing boxes fitted centrally between the side frame bars and loosely mounted on the axle, an inclined ditching shovel attached to the end extension of the rear draft bar, a filling shovel attached to the end extension of the front draft bar, and means for adjusting said shovel frame, substantially as set forth.

6. In a ditching machine of the class described, the combination of the wheeled adjustable tilting frame, an inwardly and rearwardly inclined ditching shovel attached to one end of said frame and provided with a lower forwardly inclined cutting edge and a forwardly curved flange extension at its front outer end, and a filling shovel attached to one end of the frame directly in advance of the ditching shovel and provided with a lower forwardly inclined cutting edge, and forwardly inclined end wings, one of which is less abrupt than the other, substantially as set forth.

7. In a ditching machine of the class described, the combination of a wheeled axle, a tilting shovel frame pivotally mounted on the axle and carrying front and rear forwardly operating shovels set at different angles from each other, an arched runner frame, carrying at its rear end a runner wheel or caster and connected at its front end to the axle, an offstanding attaching bracket secured to one side of the runner frame, a notched segment attached to said bracket, and an adjusting lever pivoted to said bracket and flexibly connected at its lower end to the rear end of said tilting shovel frame, said lever carrying a catch dog to engage said segment, substantially as set forth.

8. In a ditching machine of the class described, the combination of a wheeled axle, an adjustable shovel frame mounted on the axle and carrying front and rear forwardly operating shovels set at different angles from each other, a rearwardly extended arched runner frame carrying at its rear end a self-adjusting runner wheel or caster and provided at its front end with divergent frame bars attached to the axle, a draft tongue pivotally connected with the axle, and a separate pole attached to and extended forwardly and at an angle from one side of the draft tongue, substantially as set forth.

In testimony that I claim the foregoing as my own I have hereto affixed my signature in the presence of two witnesses.

FRANK E. ODELL.

Witnesses:
THOS. KAMPHEFNER,
WM. CLARDY.